United States Patent [19]

Kraemer

[11] 4,248,553
[45] Feb. 3, 1981

[54] CUTTING INSERT CONFIGURATION

[75] Inventor: Rolf H. Kraemer, Gurnee, Ill.

[73] Assignee: Fansteel Inc., Chicago, Ill.

[21] Appl. No.: 947,012

[22] Filed: Sep. 29, 1978

[51] Int. Cl.³ ............................................. B26D 1/00
[52] U.S. Cl. .................................................. 407/114
[58] Field of Search ............................... 407/113, 114

[56] References Cited
U.S. PATENT DOCUMENTS

| 3,574,911 | 4/1971 | Penoyar ............................... 407/114 |
| 3,636,602 | 1/1972 | Owen .................................. 407/114 |
| 3,875,631 | 4/1975 | Malinchak . | |

Primary Examiner—Harrison L. Hinson
Attorney, Agent, or Firm—Barnes, Kisselle, Raisch & Choate

[57] ABSTRACT

A cutting insert, especially for milling cutters or the like, which is receivable in a holder and which insert has linear edge portions which meet at the corners of the insert. The insert is indexable in the holder to present a selected edge to work to be done. Each of the edges of the inserts are serrated or notched with respective edges embodying different numbers of serrations or notches so that the inserts can be arranged in the holder to cut completely across a surface with each insert taking only a portion of the surface.

6 Claims, 4 Drawing Figures

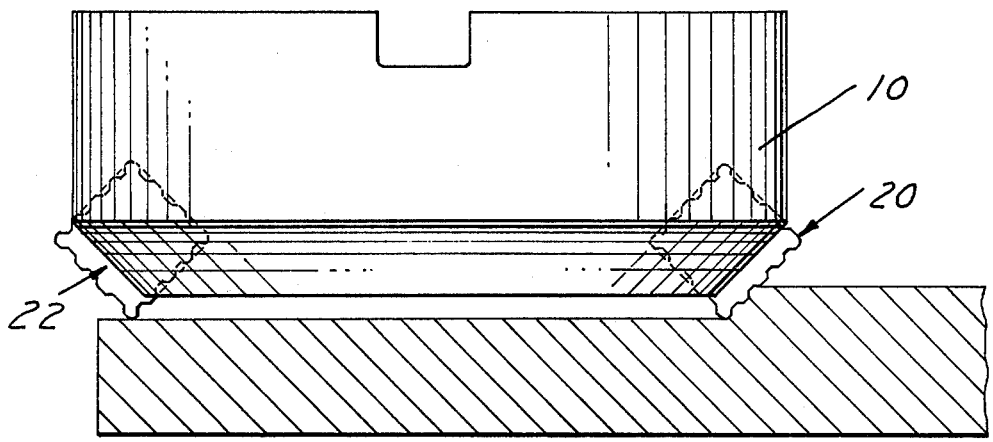
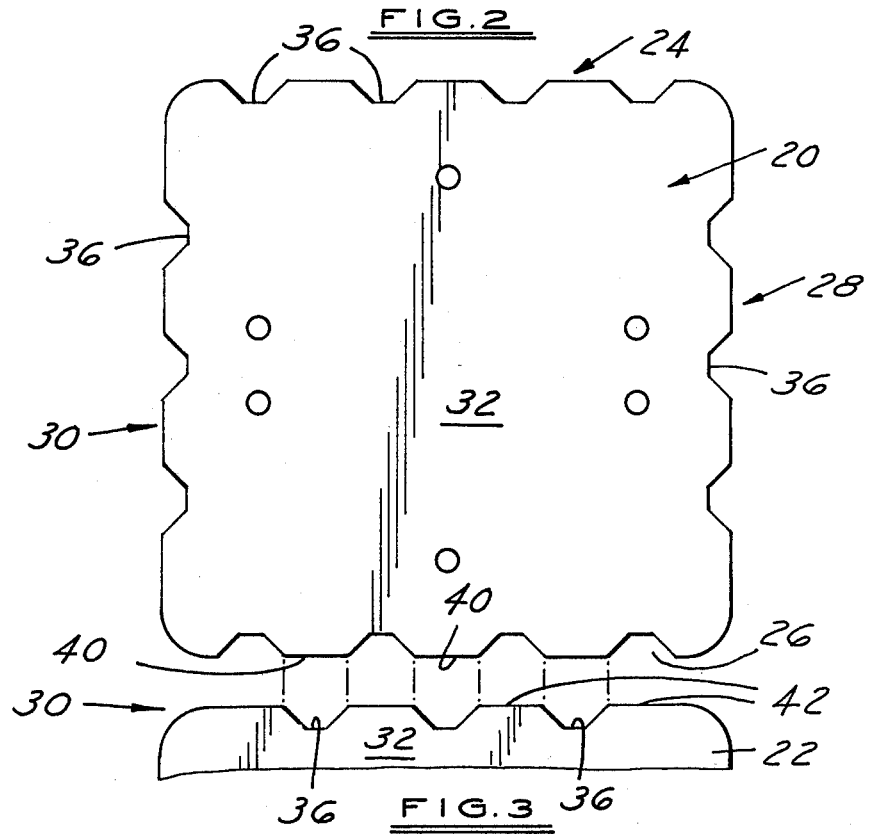
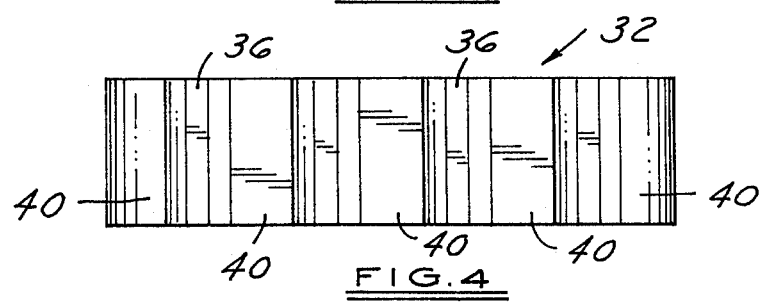

CUTTING INSERT CONFIGURATION

FIELD OF THE INVENTION

Hard metal wafer-like inserts used in tool holders such as milling heads and boring cutters having serrated edges to reduce the cutting load with staggered teeth to produce full cut.

BACKGROUND OF THE INVENTION

Since the advent of indexable, wafer-like cutting inserts, sometimes referred to as throwaway inserts, there have been numerous disclosures of the use of sinusoidal or serrated edges on these inserts. This results in smaller chips and greatly reduced chip load. The cutters are arranged in a multiple blade rotating head so that they are staggered to insure a full cut of the material surface being removed, but each projection takes just a "nibble" at the workpiece.

Examples of this type of insert are found in the United States patent to Owens, U.S. Pat. No. 3,636,602, dated Jan. 25, 1972, and to Malinchak, U.S. Pat. No. 3,875,631, dated Apr. 8, 1975. These cutters are particularly useful in roughing cuts. According to the present invention, a hard wear resistant cutting insert is provided which has faces on opposite sides facing in opposite directions and a peripheral surface extending between the faces. When viewed perpendicular to a face, the insert is polygonal, preferably, rectangular, and each edge of the insert between the respective corners is notched or grooved so that, when that particular edge of the insert engages a surface being worked, the regions of the edge between the notches or grooves will remove material from the workpiece while material will not be removed from the workpiece in the region of the notches or grooves.

When two such inserts are arranged in tandem with one following the other in spaced relation, the second insert is arranged to remove those portions of the workpiece left by the preceding insert, and with this in mind, the several edges of the inserts have at least two different numbers of grooves formed therein so that a pair of inserts can be arranged in different indexed positions and the following insert will remove what is left on the workpiece by the preceding insert.

In this manner, the holders for the inserts can be arranged to locate the inserts in a precise position by means of abutments and the insert clamped in the position and the inserts will be aligned to cooperate in the aforementioned manner.

The present invention contemplates edges of inserts with different numbers of grooves or serrations in either opposed or adjacent edges so that when arranged seriatim, a full cut will be made. For example, if two opposed edges have four indentations to provide five (including the corners) cutting projections, then the other two opposed edges (of a square insert) can have three indentations to provide four cutting projections. These projections and indentations are spaced so the combined nine cutting projections in superimposed relation provide a full sweep of the workpiece.

Thus, if there are "n" indentations or notches on one edge of an insert, there can be "n+m" notches on an adjacent edge to provide a full sweep of the work.

This arrangement greatly simplifies the setting up of a milling cutter or the like in which the inserts are provided with grooves in the edges to distribute the cutting load between the inserts.

Other objects and features of the invention will be apparent in the following description and claims in which the principles of the invention are set forth together with details to enable a person skilled in the art to practice the invention, all in connection with the best mode presently contemplated for the invention.

DESCRIPTION OF THE DRAWINGS

DRAWINGS accompany the disclosure, and the various view thereof may be briefly described as:

FIG. 1, a view of a milling cutter with the inserts of the present invention.

FIG. 2, a plan view of an insert showing the edges with diverse number of indentations.

FIG. 3, a view of an edge superimposed in relation to a diverse edge on FIG. 2.

FIG. 4, an edge view of an insert.

WITH REFERENCE TO THE DRAWINGS, in FIG. 1, a milling or boring head 10 is shown diagrammatically with a plurality of cutting inserts 20 and 22 inserted in slots in the periphery and retained by conventional wedges or clamps (not shown).

It will be seen that the insert 20 is presenting to the work an edge with four indentations and five cutting nibs, while insert 22 is presenting to the work an edge with three indentations and four cutting nibs or projections.

As illustrated in FIG. 2, the insert 20 has the top and bottom edges 24 and 26 with identical configurations while the adjacent edges 28 and 30 have identical configurations. Edges 24 and 26, which form the peripheral wall and which are perpendicular to the parallel polygonal faces 32 and 34 of the insert, have four indentations 36 while edges 28 and 30 forming the peripheral wall have three indentations.

In FIG. 3, the insert 22 has an edge 30 presented in confrontation to edge 26 of insert 20 of FIG. 2. The nibs or projections 40 of FIG. 2 register with the indentations 36 of FIG. 3 while the nibs or projections 42 of FIG. 3 register with the indentations 36 of FIG. 32. In FIG. 4, a view of the insert is shown presenting an edge showing the indentations 36 and the cutting projections or nibs 40.

While FIG. 2 illustrates an insert with opposite edges identical, the insert could be made with adjacent edges identical so that opposite edges have different numbers of indentations and projections. The embodiment of FIG. 2 is preferred since a rotation of the insert either clockwise or counterclockwise will present a different edge and this simplifies installation and indexing.

The inserts, as mentioned, can readily be indexed to present all of the edges thereof and can also be turned front to back so that each insert has eight effective edges that can be presented to the workpiece.

Insert arrangements in which each insert takes a portion only of the surface being machined are known, but the insert of the present invention differs therefrom in that flat regions of substantial length are provided between adjacent ones of the notches or grooves formed in the periphery of the insert. In this manner, two only of the inserts are necessary to completely sweep a surface being machined.

The importance of the notches or recesses in the periphery of the inserts will be appreciated in connection with the use of the insert in, for example, a milling cutter where the cutting action on each insert is interrupted and intermittent. Under these circumstances, it is preferable that the entire length of the cutting edge of an insert not be subjected to loading but, rather, only a portion thereof as the insert engages the work.

While the particular embodiment of the insert according to the present invention has been shown and described having one side with four notches therein and an adjacent side with three notches therein, it will be understood by one of ordinary skill in the art that the number of notches can vary. For instance, the insert may have n notches on one side and n plus m notches as long as the numerals n and m stand for integers which are unequal. Thus, the number of notches on one side of the insert will always be unequal to the number of notches on an adjacent or opposite side of the insert.

It has been found that a relatively smooth finish can be achieved with the present insert in which the edges of the cutting projections are relatively straight as distinguished from sinusoidal in contour. Thus, the effective cutting edges are straight and parallel to the general line of the cutting edge on which they are located. In addition, the relatively open contour of the indentations or notches prevents build up of chips which might lead to rubbing and scoring of the work and possible break down of the insert.

I claim:

1. An even sided polygonal cutting insert formed of a hard wear resistant material and comprising a body having substantially parallel polygonal faces connected by a peripheral wall which forms cutting edges at the juncture thereof with at least one of said faces, the peripheral wall having notches formed therein extending transversely to said faces and interrupting the cutting edge in regions uniformly spaced therealong and having n notches interrupting a pair of cutting edges on one face and n plus m notches interrupting another pair of cutting edges on said one face, the notches interrupting said pair of cutting edges on said one face being staggered relative to the notches interrupting said another pair when said edges are viewed in superposed relation.

2. A cutting insert according to claim 1 in which m equals one.

3. A cutting insert according to claim 1 in which n is equal to at least two and m is equal to at least one.

4. A cutting insert according to claim 1 in which n is three and m is one.

5. A cutting insert according to claim 1 in which the cutting edges which are interrupted by a corresponding number of notches are the oppositely disposed cutting edges of the insert.

6. A cutting insert as defined in claim 1 in which the cutting edges of the insert between the notches are relatively straight and parallel to the general line of the edge on which they are located.

* * * * *